United States Patent
Cochard et al.

(10) Patent No.: US 7,486,793 B2
(45) Date of Patent: Feb. 3, 2009

(54) INVOICING MANAGEMENT METHOD OF A SERVICE TRANSMITTED PER TIME UNIT

(75) Inventors: Jimmy Cochard, Attalens (CH); Henri Kudelski, Chexbres (CH); Marco Sasselli, Chardonne (CH)

(73) Assignee: NagraCard S.A., Cheseaux-sur-Lausanne (CH)

( * ) Notice: Subject to any disclaimer, the term of this patent is extended or adjusted under 35 U.S.C. 154(b) by 1414 days.

(21) Appl. No.: 10/259,752

(22) Filed: Sep. 30, 2002

(65) Prior Publication Data

US 2003/0158814 A1 Aug. 21, 2003

(30) Foreign Application Priority Data

Feb. 15, 2002 (CH) ..................................... 0265/02

(51) Int. Cl.
*H04N 7/167* (2006.01)
(52) U.S. Cl. ..................... 380/231; 380/227; 380/230; 380/232; 380/277; 380/280; 725/29; 725/31
(58) Field of Classification Search ............... 380/231, 380/232, 233, 227, 277, 278, 280; 725/29, 725/31
See application file for complete search history.

(56) References Cited

U.S. PATENT DOCUMENTS

| | | | |
|---|---|---|---|
| 5,754,651 A | | 5/1998 | Blatter et al. |
| 6,057,872 A | * | 5/2000 | Candelore .................... 725/23 |
| 6,363,149 B1 | * | 3/2002 | Candelore .................... 380/45 |
| 6,964,060 B2 | * | 11/2005 | Kamperman et al. .......... 725/31 |
| 7,058,609 B2 | * | 6/2006 | Moroney et al. .............. 705/59 |
| 7,310,810 B1 | * | 12/2007 | Hamada et al. ............... 725/91 |
| 2002/0138826 A1 | * | 9/2002 | Peterka .......................... 725/1 |
| 2004/0101138 A1 | * | 5/2004 | Revital et al. ............... 380/210 |

FOREIGN PATENT DOCUMENTS

| | | |
|---|---|---|
| JP | 2001/326924 | 11/2001 |
| TW | 378473 | 1/2000 |
| TW | 410519 | 11/2000 |
| WO | WO 01/08345 | 2/2001 |

OTHER PUBLICATIONS

Taiwanese Patent Office Search Report dated Jul. 18, 2008 and English language translation thereof.

* cited by examiner

*Primary Examiner*—Kim Yen Vu
*Assistant Examiner*—Beemnet W Dada
(74) *Attorney, Agent, or Firm*—Harness, Dickey & Pierce, P.L.C.

(57) ABSTRACT

The objective of the present invention is to propose an accounting method of the consumption of transmitted services per time unit to a decoder in a system implementing a content encrypted by control words, the latter being modified according to a period named crypto-period.

Figure 1:
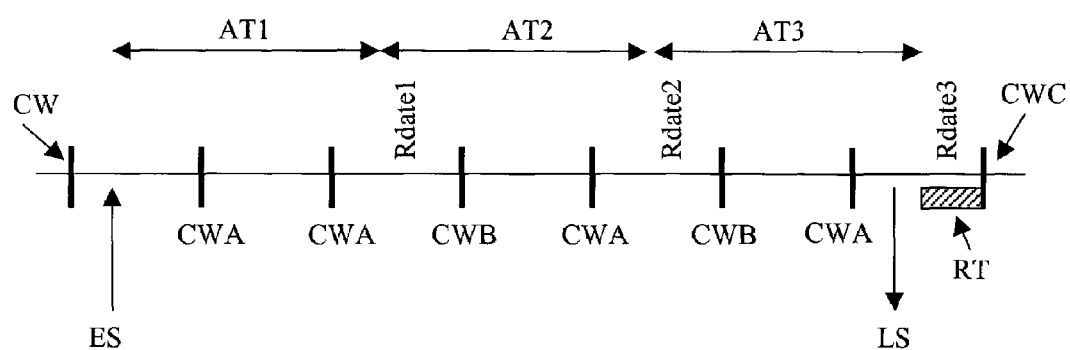

This method consists in verifying if the time-current (TC) is comprised in a time variable (Rdate) representative of the authorisation time of use of the service and, if this is the case, decrypting and returning the control words to the decoder, and if it is not the case, debiting an amount (CT) corresponding to a time of use (AT) and recharging the time variable (Rdate) with a corresponding time.

12 Claims, 1 Drawing Sheet

INVOICING MANAGEMENT METHOD OF A SERVICE TRANSMITTED PER TIME UNIT The present application concerns the field of receivers/decoders of conditional access services, particularly the accounting procedure of the reception and use of conditional access contents.

By content we understand a service of information of stock exchange, weather, general television, a sports event, or others. These contents can be transmitted to user units such as a pay television decoder, a computer or even a mobile telephone, a palmtop, a PDA, a radio, a television, or a multimedia station.

The digital stream is encrypted in order to be able to control the use and to define the conditions for such a use. This encryption is performed thanks to control words that are changed at a regular interval (between 5 and 30 seconds) so as to dissuade any attack trying to discover such a control word.

For the user unit to be able to decrypt the stream encrypted by a control word, the latter is sent to said user unit independently from the stream in a control message (ECM) encrypted by a key that is specific to the transmission system between the operating centre (CAS) and the security module of the user unit. In fact, the security operations are carried out in a security module (SC) that is generally in the form of a smart card, considered secure. This unit can either be of removeable type or directly integrated in the user unit processing the signals such as a pay television decoder or a DAB receiver.

During the decryption of the control message (ECM), we verify in the security module (SC) that the right to access the considered stream is present. This right can be administered by authorisation messages (EMM) that load such a right in the module (SC). Other possibilities are also possible, such as the sending of decryption keys.

The accounting of the use of such contents is based today on the principle of subscription or event purchase. The subscription defines the right associated to one or several transmission channels and allows the user to obtain these channels in plaintext if the right is present in his/her security module.

At the same time, it is possible to define rights that are specific to a content, such as a film or a football match. The user can acquire this right (purchase for example) and this content will be specifically administered by this right. This method is known as pay-per-view (PPV).

During the decryption of the control words it will verify if a right associated to the conditions of access is present in the security module.

The control word is returned in decrypted to the user unit only when the comparison is positive.

This way of functioning is satisfied for many applications, but does not allow to answer to certain needs. For example, for stock exchange information or for the transmission of music, that have as characteristics not having a defined duration, the solutions described above do not allow the accounting by subscription. Furthermore, new supports such as the Digital Area Broadcasting (DAB) or the online games present similar needs of accounting other than by subscription.

Thus, the person who will occasionally consult the price of his/her preferred action will have to subscribe with the same conditions than he/she who uses this tool intensively.

This is why the objective of the present invention is to integrate in the system of conditional access the management of the use for a determined duration. Several constraints linked to the encrypted transmission system of pay television do not allow to apply today an equivalent principle to telephones for example.

In fact, the security module (SC) does not have an internal clock and furthermore is placed outside the decoder, which means that it does not have access to the functions of the decoder. This module only has at its disposal the control words to authorise (or not authorise) the decryption of the data.

To this is added the fact that the control words are changed at a regular interval that may not have any relation with the accounting period.

In the following description, we will use the expression "crypto-period" for the time during which a control word allows decryption of the content that arrives at the user unit, and "invoicing unit" for the minimum accounting period.

While the crypto-period can vary between 0.5 and 30 seconds and respond to security criteria, the accounting unit in itself can be fixed between 10 seconds and 24 hours for example and responds to marketing criteria. It has to be known that the security module (SC), once decrypted the control word valid for the crypto-period, has no longer means to verify if the real use has lasted all or part of this crypto-period.

The aim of the present invention is to allow the invoicing of the accounting units, at the same time taking into account that there cannot be any relation between the crypto-period and the invoiced unit.

This aim is achieved by a method of temporal accounting of access to a stream of data encrypted by control words (CW) modified at intervals representing a crypto-period (CP), this stream being received by a user unit (UU) linked to a security module (SC) in charge of verifying the rights of a user and of decrypting the control words (CW), this accounting being based on accounting units (CT) authorising the use of the service for an assigned time (AT), this method comprising the following steps:

a. commutation by the user on an encrypted stream constituting a service of access by time unit, b. reception by the security module (SC) of encrypted messages (ECM) containing the control words (CW) and data specific to said service allowing to determine the assigned time (AT) and its cost (CT) of the accounting unit, c. reading of a time variable (Rdate) representative of the time during which the use of said service is authorised, d. determining, on the basis of the time-current (TC), if it is placed during the authorisation time defined by the time variable (Rdate), and if it is the case, to authorise the service by resending the control words (CW) to the user unit (UU), e. if it is not the case, to order the debit an accounting unit (CT) and to determine if the time-current (TC) is comprised in an assigned time (AT) adjacent to the duration defined by the time variable (Rdate), if it is the case to determine the new value of the time variable (Rdate) in order to move the latter from an assigned time (AT), and to authorise the service by resending the control words (CW) to the user unit, f. if it is not the case, to charge the time variable (Rdate) of an assigned time (AT) starting from the time-current (TC).

This method allows to take into account past events, that is, the last use of this service to determine the assigned time to each invoicing unit. In fact, when the invoicing time is near the crypto-period time, for example 20 seconds for the crypto-period and 1 minute for the invoicing unit, the principle of taking again the last expiration of authorisation and of adding to it the assigned time per accounting unit newly acquired allows to resolve all the uncertainties.

It is evident that one of the intermediate stages consists in verifying if the user has enough credit to accept the debit of an accounting unit before returning the control words.

It is important to note that the time variable (Rdate) remains valid even if the user changes service. This variable is specific to a service or to a group of services. When returning to the service previously accounted for, this variable is compared with the current moment, and if the latter is comprised in the time defined by the time variable, the service is then immediately authorised without accounting of the supplementary unit.

There are several means for accomplishing the aimed function by the time variable. A first way is the use of a time counter that contains the moment when the authorisation of service finishes. If the time-current is lower than this counter, we consider that the service is authorised. With each overflow of this counter we add the assigned time (AT). In this way we move this pointer, which is generally stored in EEPROM memory. This allows to disconnect the user unit (UU) without losing the moment of end of authorisation.

According to another embodiment, this time variable contains the moment in which an accounting unit has been debited. The authorised time is from then on constituted by a window defined by the Rdate variable and the assigned time AT.

One embodiment consists in using a counter in charge of defining the period of authorisation. According to the embodiment, this counter can be a time counter incremented by the security module, or can be an ECM message counter. In fact, the crypto-period being a known parameter of the system, it is possible to define that the accounting unit authorises the decryption of 150 ECM messages. The assigned time (AT) will then correspond to a number of ECM messages.

Figure 2:
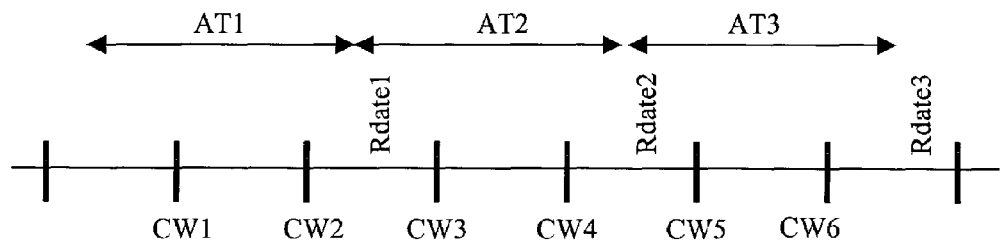

The invention will be better understood with the help of the following detailed description, which makes reference to the annexed figures that are given as a non-limiting example, namely:

FIG. 1 illustrates a time diagram during the commutation on a service subjected to the accounting by time unit, FIG. 2 illustrates the case where we move forward or reverse in the encrypted stream.

In FIG. 1, the control words CW are illustrated by thick black lines. The moment of commutation on the service is marked by the arrow ES. At this moment, the ECM message containing the control word CW valid during this period is transferred to the security module SC. The first control is to know if the time variable Rdate is in the future. If this is the case, no debit is carried out and the control word CW is returned to the decoder. This case is presented for the control words named CWA.

According to a first embodiment, the time-current is transmitted by means of ECM messages. In this case, it is necessary to introduce a preliminary stage, namely, to control if the Rdate variable is not too much in the future. This is possible when we retransmit the same emission, for example thanks to a digital video recorder DVR. Without this verification it would be possible to transmit the last seconds of a transmission to fix the variable to a moment corresponding to the end of the transmission and then to transmit all the transmission from the start. The Rdate variable being from then on always future compared with the beginning of the transmission, the control of authorisation is positive without any accounting unit being necessary.

In this way, if the Rdate variable is bigger than the sum of the time-current and the assigned time, (Rdate>TC+AT), we consider the Rdate variable not valid and the security module will record one accounting unit CT and calculate the new variable according to the formula: Rdate=TC+AT.

If the Rdate variable is in the past, the security module SC determines if it is convenient to use the last known Rdate variable to define the starting point of the authorisation, or if it is necessary to take the time-current TC. For this, it is convenient to know if the Rdate variable is sufficiently near in the past so that the addition of the assigned time (AT) allows to overflow the time-current.

This case is presented during a use of this same service at whatever previous time. As mentioned above, the verification is performed when a new ECM message containing a control word arrives.

The security module SC does not have the means to determine if the user has used the service between the end of the authorised time defined by the Rdate variable and the arrival of the new control word.

This situation is illustrated in FIG. 1 by the RT zone. In this example, since the entry in the service illustrated by the ES arrow, the user has been flow-rated by three accounting units (CT1, CT2, CT3) corresponding to three assigned times (AT1, AT2, AT3) that have successively moved the Rdate variable to the values Rdate1, Rdate2, and Rdate3. The control words CWA have not had effect on the accounting because the Rdate variable was in the future, contrary to the situation during the arrival of the control words CWB, where one accounting unit was flow-rated.

According to this example, between the end of the AT3 period and the arrival of the new control word CWC, nothing indicates that the user has remained on this service if he/she commutes before the arrival of this control word CWC.

Thus, there exists an uncertainty zone that can become important if the crypto-period is long. This is why during the entry in the service it is the previous time variable Rdate0 that is taken again in the measure that it is near in the past according to the formula:

Rdate1=Rdate0+AT; as long as Rdate1>TC (TC=time-current, AT=assigned time per invoicing unit).

According to a particular embodiment of the invention, the ECM messages containing the control words allow to define the time-current TC. Thus, the time-current does not change between two ECM's. This implementation allows to be synchronised easily when such a transmission is replayed by means of a digital video recorder DVR for example.

According to an embodiment of the invention, the time of the invoicing unit and the assigned time are contained in the ECM message. This allows to vary the invoicing depending on the needs and the value of the object being transmitted. It is thus possible to invoice a famous show more expensively than the news or the weather forecast.

If such a possibility is used, apart from the time variable Rdate, we store the conditions that have taken us to place this variable at its moment, conditions that comprise the invoicing unit and the assigned time. Upon receiving an ECM message, apart from verifying if the time-current TC is before the Rdate moment, we also verify if the grant conditions are unchanged. Without this verification it would be possible to receive a cheap service to fix the Rdate variable in the future and to then receive an expensive service added that would be authorised until the end of the authorisation period defined by the Rdate variable.

If we suppose that the time of the crypto-period can be longer that the invoicing unit, a supplementary test must be carried out. In fact, it is possible that the result Rdate2=Rdate1+AT is lower than the TC (time-current). It is then necessary to calculate Rdate 2'=Rdate2+AT and to account for two invoicing units.

In certain applications, the assigned time (AT) is very big compared with the crypto-period. In this case, the question of knowing if during a crypto-period the time was overflowed is not important. In this type of implementation we will only use the time-current to determine the new time variable according to the formula: Rdate2=TC+AT, without taking into account the previous value of Rdate.

With the apparition of digital recorders, new constraints appear. In fact, it is possible to retransmit a content, to go forward or reverse at normal or fast speed. It is then necessary to foresee this invoicing per time unit in all these examples.

As explained above, according to the preferential embodiment of the invention, the time-current is that contained in the ECM messages. This has as a consequence that when we advanced quickly for example ×5, the time also passes 5 times quicker. According to the mode described above, we will arrive 5 times faster to the time variable Rdate, and as a consequence we will pay 5 times more than at the initial speed. This function is desired in order to prevent a third party from decrypting all the ECM messages during an accounting unit and then replaying, at normal speed, the whole of the chosen event for a fraction of its normal price.

This is why the two solutions described above, namely, the time variable using the time of the message to define the authorised time and the use of a message counter, answer to this problem.

Another aspect to be considered is the mode of reverse read. In this case, two possibilities are proposed.

The first solution is called automatic because it is based on an internal determination by the security module. If the time-current is comprised in an assigned time following the previous authorised time, we are in forward mode and the new authorised time is defined:

$$Rdate2 = Rdate1 + AT$$

In the case in which we are in a previous time to the last authorised time, this means that we are in reverse mode. The new authorised time is defined:

$$Rdate2 = Rdate1 - AT$$

This mechanism is illustrated in FIG. 2, the current authorised time being represented by AT2. In the case of the advance, the next ECM message is represented by CW5. The latter being comprised in the time=Rdate2 30 AT, it is then the forward mode that is applied and then is determined by Rdate3=Rdate2+AT.

In the case where it is the message containing CW2 that is present in the security module, the latter being in the period previous to the authorised one, we determine the new Rdate variable according to the value Rdate1=Rdate2−AT.

A second solution consists in extracting the information that accompanies the ECM message. In this information are directions about the origin of the data, transmitted or registered in the latter case, if the recorder is in forward or reverse mode. According to this state, we will apply one or the other of the methods described above.

The invention claimed is:

1. A time accounting method of access to a stream of data encrypted by control words (CW) modified at intervals representing a crypto-period (CP), said stream being received by a user unit (UU) connected to a security module (SC) in charge of verifying the rights of a user and of decrypting messages (ECM) including the control words (CW), said accounting being based on accounting units (CT) authorising the use of the service for an assigned time (AT), said method comprising:

communicating an encrypted stream constituting an access service per time unit, said stream being divided into a plurality of accounting units, each unit being paid separately;

receiving of encrypted messages (ECM) by the security module (SC), the messages containing the control words (CW) and data specific to said service allowing to determine the assigned time (AT) and cost (CT) of the accounting unit;

reading of a time variable (Rdate) representative of the time during which the use of said service is authorised, a value of the time variable (Rdate) being dynamically updated based on at least a time-current (TC), the time-current (TC) varying based on a time base included in each message (ECM);

determining, if the time-current (TC) is placed during the authorisation time defined by the time variable (Rdate), and if this is the case, authorising the service by resending the control words (CW) to the user unit (UU);

if this is not the case, ordering the debit of an accounting unit (CT) and determining if the time-current (TC) is included in an assigned time (AT) adjacent to the time interval defined by the time variable (Rdate), and if this is the case, determining the new value of the time variable(Rdate) in order to move the time variable (Rdate) from an assigned time (AT), and authorising the service by resending the control words (CW) in plaintext to the user unit; and if this is not the case, loading the time variable (Rdate) of an assigned time (AT) starting from the time-current (TC) and authorising the service by resending the control words (CW) in plaintext to the user unit.

2. A time accounting method according to claim 1, the method further comprising:

verifying a credit contained in the security module (SC) in order to determine if the credit is at least equal to the accounting unit (CT).

3. A time accounting method according to claim 1, wherein the time base defines the time-current (TC) and the time variable (Rdate) contains the moment in which the authorisation of use of the service ends according to this time base.

4. A time accounting method according to claim 3, the method further comprising:

verifying, in the case where the time variable (Rdate) is in the future compared with the time-current (TC), if the time variable is beyond a moment defined by the sum of the time-current (TC) and of the assigned time (AT), and if this is the case, considering the time variable (Rdate) as out of the authorisation time.

5. A time accounting method according to claim 1, wherein the new authorised time (Rdate) either follows the last authorised period (Rdate) or precedes the last authorised period (Rdate) according to the sense of time movement in the encrypted stream.

6. A time accounting method according to claim 5, wherein the sense of movement is transmitted to the security module (SC) with the messages (ECM) by the user unit (UU).

7. A time accounting method according to claim 5, wherein the time-current (TC) is extracted from the message (ECM), and in that the authorised time (Rdate') follows the last authorised period (Rdate) if the time-current is in this period, or the authorised time (Rdate') precedes the last authorised period (Rdate) if the time-current (TC) is in this period.

8. A time accounting method according to claim 2, wherein the time base defines the time-current (TC) and the time variable (Rdate) contains the moment in which the authorisation of use of the service ends according to this time base.

9. A time accounting method according to claim 2, the new authorised time (Rdate) either follows the last authorised period (Rdate) or precedes the last authorised period (Rdate) according to the sense of time movement in the encrypted stream.

10. A time accounting method according to claim 3, wherein the new authorised time (Rdate) either follows the last authorised period (Rdate) or precedes the last authorised period (Rdate) according to the sense of time movement in the encrypted stream.

11. A time accounting method according to claim 4, wherein the new authorised time (Rdate) either follows the last authorised period (Rdate) or precedes the last authorised period (Rdate) according to the sense of time movement in the encrypted stream.

12. A time accounting method according to claim 8, wherein the new authorised time (Rdate) either follows the last authorised period (Rdate) or precedes the last authorised period (Rdate) according to the sense of time movement in the encrypted stream.

\* \* \* \* \*